United States Patent
Arana

(10) Patent No.: US 10,917,451 B1
(45) Date of Patent: Feb. 9, 2021

(54) SYSTEMS AND METHODS TO FACILITATE SELECTIVE DIALOGUE PRESENTATION

(71) Applicant: Disney Enterprises, Inc., Burbank, CA (US)

(72) Inventor: Mark Arana, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 16/791,694

(22) Filed: Feb. 14, 2020

(51) Int. Cl.
| | |
|---|---|
| H04L 29/06 | (2006.01) |
| G06F 16/432 | (2019.01) |
| G06F 16/683 | (2019.01) |
| G06F 16/483 | (2019.01) |
| G06F 3/16 | (2006.01) |
| H04L 12/18 | (2006.01) |

(52) U.S. Cl.
CPC ............ *H04L 65/602* (2013.01); *G06F 3/167* (2013.01); *G06F 16/433* (2019.01); *G06F 16/483* (2019.01); *G06F 16/683* (2019.01); *H04L 12/1827* (2013.01)

(58) Field of Classification Search
CPC . H04L 65/602; H04L 12/1827; G06F 16/683; G06F 3/167; G06F 16/483; G06F 16/433
See application file for complete search history.

(56) References Cited

U.S. PATENT DOCUMENTS

| | | | |
|---|---|---|---|
| 9,131,551 B2 | 9/2015 | Hovey | |
| 10,284,809 B1* | 5/2019 | Noel | H04N 5/9305 |
| 1,042,567 A1 | 9/2019 | Hellam | |
| 2002/0016736 A1 | 2/2002 | Cannon | |
| 2005/0166241 A1 | 7/2005 | Kim | |
| 2008/0181585 A1 | 7/2008 | Bryant | |
| 2009/0288120 A1 | 11/2009 | Vasudevan | |
| 2011/0103763 A1 | 5/2011 | Tse | |
| 2012/0120314 A1 | 5/2012 | Yang | |
| 2012/0324324 A1* | 12/2012 | Hwang | G11B 27/11 715/203 |
| 2014/0304597 A1 | 10/2014 | Einstein | |
| 2015/0237301 A1 | 8/2015 | Shi | |
| 2016/0184726 A1 | 6/2016 | Andersson | |
| 2019/0052473 A1* | 2/2019 | Soni | G09B 21/009 |
| 2019/0068664 A1 | 2/2019 | Kieft | |

OTHER PUBLICATIONS

Formerly Wham City Lights; Make Amazing Lightshows URL:http://offli.ne/#/app/home [retrieved on Dec. 20, 2016] 2 pgs.
Gloto Syfy Sync URL:https://www.gloto.com/work/syfy-sync [retrieved on Dec. 20, 2016] 11 pgs.

* cited by examiner

*Primary Examiner* — Kim T Nguyen
(74) *Attorney, Agent, or Firm* — Esplin & Associates, PC

(57) ABSTRACT

This disclosure presents systems and methods to facilitate selective dialogue presentation for multimedia presentations. Exemplary implementations may: present visual content of the multimedia presentation on a display device; present effects audio content of the multimedia presentation on a set of audio presentation devices; communication of individual dialogue audio content of the multimedia presentation to individual user devices to cause the individual user devices to present individual dialogue audio content in sync with the presentation of the visual content and/or the effects audio content; and/or other operations.

20 Claims, 4 Drawing Sheets

US 10,917,451 B1

SYSTEMS AND METHODS TO FACILITATE SELECTIVE DIALOGUE PRESENTATION

FIELD

This disclosure relates to systems and methods to facilitate selective dialogue presentation, in particular, for consumption of a multimedia presentation.

BACKGROUND

Traditionally, a movie theater projects a movie onto a large projection screen using a projector. Sound effects and music may be played through a number of wall-mounted surround sound speakers. Often a central speaker (or speakers) was positioned behind the projection screen to project audio through the projection screen. The central speaker(s) functioned as an audio channel primarily presenting dialogue, as well as other sound intended to come from immediately in front of the listener (e.g., sound effects intended to be perceived as being in front of the listener). More recently, the projector and projection screen are being replaced by light emitting diode (LED) screens. These modern LED screens may allow for more vibrant color definition with enhanced clarity and resolution. The LED screen, however, may not permit a central audio channel speaker to be positioned behind the LED screen for audio projection through the LED screen. Instead, the audio channel may also be presented through one or more of the wall-mounted speakers.

Movies are often produced for a target audience of one native language. When a movie is presented in a foreign language, the movie in its entirety may be dubbed over by foreign language voice actors, or the movie may be modified to include subtitles in the foreign language while maintaining the native language dialogue.

Movies may be rated for their intended audiences. For example, ratings may be based on occurrences of violent and/or sexual imagery, profane language, and/or drug-related material. In the case of movies having profane language, some movies may include alternative dialogue used to substitute (e.g., dub over) profane language for language more suitable for younger audiences.

SUMMARY

One aspect of the disclosure relates to a system configured to facilitate selective dialogue presentation. Some theater goers would benefit from having individualized audio tracks to create a better experience. By way of non-limiting illustration, a French speaker might prefer to listen to the French language track, while a customer of another native language might want to hear the dialogue in their native language. By way of non-limiting illustration, an adult parent might prefer to listen to unaltered dialogue including profane language, while preferring that their minor child hears the dialogue dubbed over with age appropriate language. In some current solutions, different users may use headphones and listen to their preferred dialogue while the effects audio and native language dialogue are presented in conventional manners. However, problems may exist in that the dialogue via the headphones may not fully block the original native language dialogue, so the dialogue via the headphones may not be as clear as it could be.

One or more aspects of the disclosure may describe techniques where effects audio may be provided by audio presentation devices that are typically laid out in the theater (e.g., wall-mounted surround sound speakers). For the dialogue audio and/or other audio intended to come from immediately in front of the listener, instead of relying on the center channel speaker(s) that traditionally sit behind a projection screen and/or the one or more of the wall-mounted speakers, one or more implementations of the system presented herein may use user devices that are closer to the users heads. Examples of user devices may include one or more of headphones, speakers built into the headrests of the seats, bone conducting headphones, mobile computing platforms, and/or other devices. In some implementations, individual user devices may be configured to selectively present dialogue audio of a given language. In some implementations, individual user devices may be configured to selectively present dialogue audio of a given age appropriateness rating. In this way, individual users may have individualized theater experiences.

One or more implementations of a system configured to facilitate selective dialogue presentation may include one or more of one or more servers, one or more user devices, one or more display devices, one or more audio presentation devices, and/or other components. Individual display devices and/or individual sets of audio presentation devices may be physically located at and/or fixed to movie theaters, home theater rooms, and/or other locations. In some implementations, individual user devices may be one or more of physically located at and/or fixed to movie theaters, mobile devices associated with movie theaters, and/or mobile devices associated with individual users.

The one or more servers may include one or more of non-transitory electronic storage, one or more physical processors, and/or other components. The one or more servers may communicate with one or more user devices, one or more display devices, and/or one or more audio presentation devices via client/server architecture, and/or other communication schemes.

The non-transitory electronic storage may store media information for a multimedia presentation and/or other information. The media information may include one or more of visual information, audio information, synchronization information, and/or other information. The visual information may define visual content of the multimedia presentation. The visual content may be in the form of images, image sequences, lighting control sequences, and/or other content. The audio information may define one or more of effects audio content, a set of dialogue audio content, and/or other forms of audio content of the multimedia presentation. The effects audio content may include one or more of surround sound effects, centered sound effects, and/or other effects audio. The surround sound effects may refer to sounds intended to be presented by a set of audio presentation devices which may be wall-mounted within an environment. The centered sound effects may refer to audio intended to come from immediately in front of the listener which is different from the dialogue. The set of dialogue audio content may include separate and distinct dialogue audio content in different languages. The set of dialogue audio content may include separate and distinct dialogue audio content of different ratings. The ratings may refer to the Motion Picture Association of America (MPAA) film rating system and/or other rating system used to rate a film's suitability for certain audiences based on its content. By way of non-limiting illustration, the set of dialogue audio content may include one or more of dialogue audio content in a first language, dialogue audio content in a second language, dialogue audio of a first rating (e.g., intended for a first age range), dialogue audio of a second rating (e.g., intended for a second age range), and/or other dialogue audio content. The synchronization information may include information which facilitates synchronized playback of one or more of the visual content, effects audio content, and individual ones of the dialogue audio content.

The one or more physical processors may be configured by machine-readable instructions. Executing the machine-readable instructions may cause the one or more physical processor to facilitate selective dialogue presentation. The machine-readable instructions may include one or more computer program components. The computer program components may include one or more of a visual component, an effects component, a dialogue component, and/or other components.

The visual component may be configured to effectuate presentation of visual content on individual display devices. By way of non-limiting illustration, the visual component may communicate commands and/or instructions to individual display devices to present the visual content.

The effects component may be configured to effectuate presentation of the surround sound effects of the effects audio content by individual sets of audio presentation devices. The presentation of surround sound effects may be in sync with the presentation of corresponding visual content. By way of non-limiting illustration, the effects component may communicate commands and/or instructions to individual audio presentation devices to reproduce surround sound effects of the effects audio content.

The dialogue component may be configured to effectuate communication of audio information defining individual dialogue audio content and/or centered sound effects of the effects audio content to individual user devices. As used herein the term "centered audio content" may refer to one or both of individual dialogue audio content and/or centered sound effects of the effects audio content. The communication to the individual user devices may cause the individual user devices to present the individual centered audio content in sync with the presentation of visual content and/or other effects audio content. An individual user device may be configured to selectively present an individual centered audio content based on one or more of an individual language, an individual rating, and/or other features. By way of non-limiting illustration, audio information defining first centered audio content (e.g., dialogue audio content of a given language and/or rating and centered effects audio) may be communicated to a first user device associated with a first user to cause the first user device to present the first centered audio content in sync with the presentation of visual content and/or other effects audio content. By way of non-limiting illustration, audio information defining second centered audio content (e.g., dialogue audio content of another given language and/or rating and centered effects audio) may be communicated to a second user device associated with a second user to cause the second user device to present the second centered audio content in sync with the presentation of visual content and/or effects audio content.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
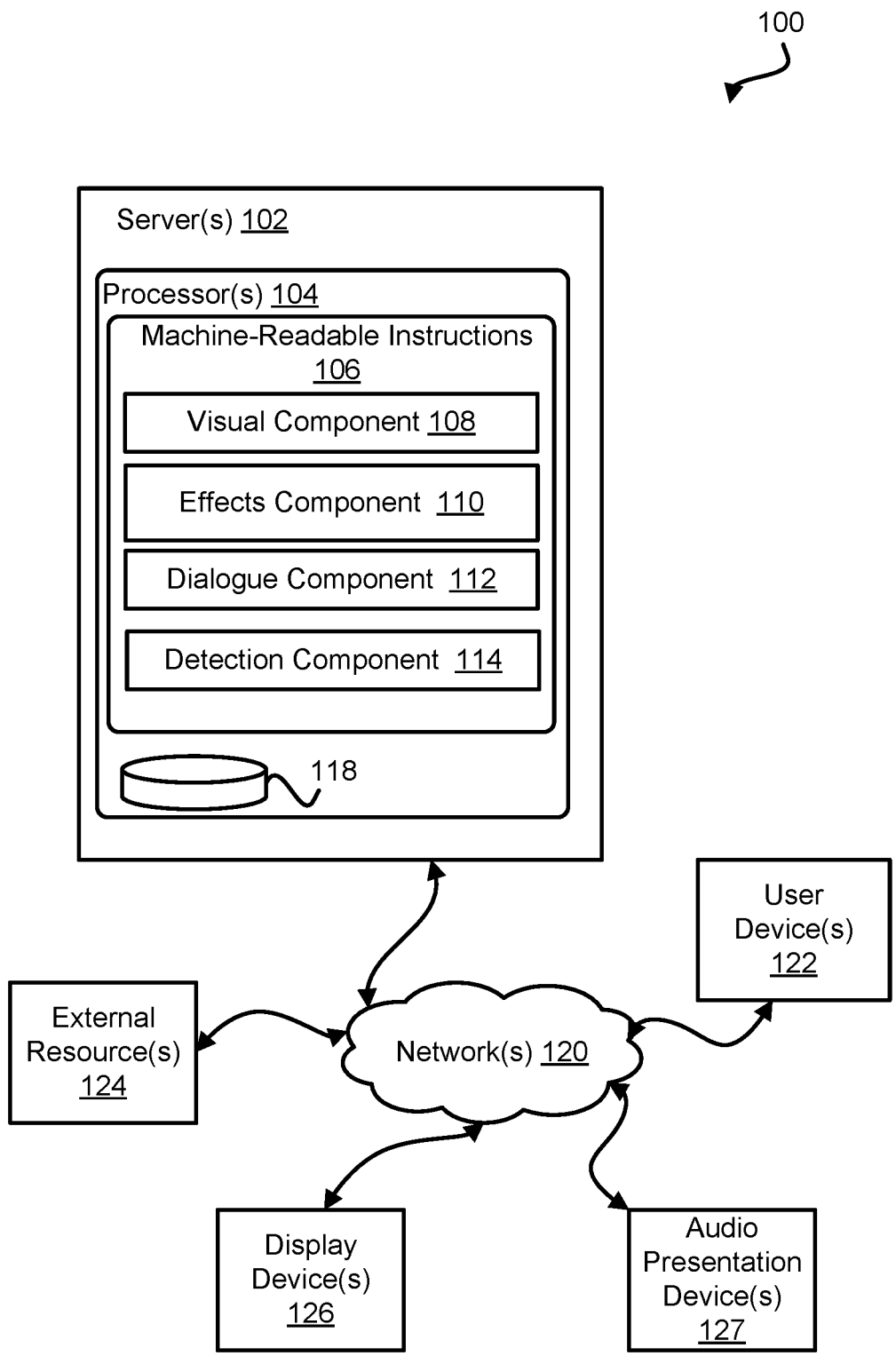
FIG. 1 illustrates a system configured to facilitate selective dialogue presentation, in accordance with one or more implementations.

FIG. 1 illustrates a system 100 configured to facilitate selective dialogue presentation, in accordance with one or more implementations. Surround sound effects audio may be provided by audio presentation devices that are typically laid out in a theater (e.g., wall-mounted surround sound speakers). For the dialogue audio and/or other audio intended to come from immediately in front of the listener, user devices which may be closer to the users heads may be utilized. Examples of user devices may include one or more of headphones, speakers built into the headrests of the seats, bone conducting headphones, mobile computing platforms, and/or other devices. Individual user devices may be configured to selectively present dialogue audio of one or more of a given language, a given rating, and/or other features. In this way, individual users may have their individualized dialogue track while still enjoying the benefits of a theater experience (e.g., surround sound audio for sound effects).

The system 100 may include one or more of one or more servers 102, one or more user devices 122, one or more display devices 126, one or more audio presentation devices 127, and/or other components. The one or more servers 102 may include one or more of one or more physical processors 104, non-transitory electronic storage 118, and/or other components. The non-transitory electronic storage 118 may be configured to store information utilized by one or more servers 102, one or more user devices 122, one or more display devices 126, one or more audio presentation devices 127, and/or other components of system 100.

The non-transitory electronic storage 118 may be configured to store media information for individual multimedia presentations and/or other information. The media information for a given multimedia presentation may include one or more of visual information, audio information, synchronization information, and/or other information.

The visual information may define visual content of the multimedia presentation. The visual content may be in the form of images, image sequences, lighting control sequences, and/or other content.

The audio information may define one or more of effects audio content, a set of dialogue audio content, and/or other forms of audio content of the multimedia presentation. The effects audio content may include one or more of surround sounds effects, centered sound effects, and/or other effects audio. Centered sound effects may refer to audio, other than dialogue, intended to come from immediately in front of the listener. The set of dialogue audio content may include separate and distinct dialogue audio content. The individual dialogue audio content may be distinct by virtue of different language, different rating, and/or other features. By way of non-limiting illustration, the set of dialogue audio content for a given multimedia presentation may include one or more of dialogue audio content in a first language, dialogue audio content in a second language, dialogue audio content of a first rating, dialogue audio content of a second rating, and/or other dialogue audio content. As used herein the term "centered audio content" may refer to one or both of individual dialogue audio content and/or centered sound effects of the effects audio content.

The synchronization information may include information which facilitates synchronized playback of one or more of the visual content, effects audio content, and individual ones of the dialogue audio content. The synchronization information may include one or more of one or more audio fingerprints and/or watermarks within the effects audio content, a timecode associated with one or more of visual content, effects audio content, and/or individual ones of the dialogue audio content, and/or other information.

Individual audio presentation devices of one or more audio presentation devices 127 may include devices configured to present audio content. An audio presentation device may be configured to present audio content in the form of words, sounds, and/or other audio content. An audio presentation device may include, for example, a speaker. In some implementations, a set of audio presentation devices may be arranged to provide surround sound audio for a group of users. In some implementations, individual audio presentation devices may be wall mounted.

The non-transitory electronic storage 118 may be configured to store profile information and/or other information. The profile information may include user profiles for users of the system. The individual user profiles may indicate one or more of language preference for the individual users, language rating preference for the individual users, and/or other information. By way of non-limiting illustration, a first user profile for a first user may indicate a language preference of a first language. By way of non-limiting illustration, a second user profile for a second user may indicate a language preference of a second language.

An individual display device of one or more display devices 126 may be configured to present visual content. A display device may include one or more of an LED screen, a touchscreen, a monitor, a set of screens, and/or other displays.

Individual user devices of one or more user devices 122 may include devices configured to centered audio content. A user device may include one or more audio output devices and/or other components. An individual user device of one or more user devices 122 may include one or more of a mobile device, a stationary device, and/or other user devices. A mobile device may include one or more of a mobile computing platform, a mobile headphone, and/or other device. A mobile computing platform may include one or more of a cellular telephone, a smartphone, a laptop, a tablet computer, a virtual reality (and/or augmented reality) platform, and/or other user devices. A mobile headphone may include one or more of earbud style headphone, over the ear headphone, bone conducting headphone, and/or other mobile headphone. A stationary device may include a headrest-mounted audio device. A headrest-mounted audio device may include one or more speakers and/or other components.

In some implementations, individual user devices may include components configured to facilitate wired and/or wireless communication with other components of system 100. For example, individual user devices may include one or more wireless communication components. Wireless communication components may include one or more of radio frequency transceivers, Bluetooth device, Wi-Fi device, near-field communication devices, and/or other wireless communication components. By way of non-limiting illustration, individual user devices may comprise a radio-frequency identification (RFID) chip configured to emit and/or receive radio-frequency electromagnetic signals. In some implementations, an RFID chip may be configured to emit detection information and/or other information. Detection information may include one or more of information conveying a presence of a user device, information conveying an identity of the user device, information conveying an identity of a user of the user device, and/or other information.

The one or more physical processors 104 may be configured by machine-readable instructions 106. Executing machine-readable instructions 106 may cause one or more physical processors 104 to facilitate selective dialogue presentation. The machine-readable instructions 106 may include one or more computer program components. The one or more computer program components may include one or more of a visual component 108, an effects component 110, a dialogue component 112, a detection component 114, and/or other components.

The visual component 108 may be configured to effectuate presentation of visual content on individual display devices of one or more display devices 126. By way of non-limiting illustration, the visual component 108 may effectuate communication of one or more of visual information defining visual content, synchronization information, commands and/or instructions to present the visual content, and/or other information to individual display devices of one or more display devices 126.

The effects component 110 may be configured to effectuate presentation of effects audio content by individual sets of audio presentation devices of one or more audio presentation devices 127. The presentation of effects audio content may be in sync with the presentation of corresponding visual content. By way of non-limiting illustration, the effects component 110 may effectuate communication of one or more of audio information defining surround sound effects of the effects audio content, synchronization information, commands and/or instructions to present surround sound effects of the effects audio content, and/or other information to individual sets of audio presentation devices of one or more audio presentation devices 127.

The dialogue component 112 may be configured to effectuate communication of audio information defining centered audio content to individual user devices of one or more user devices 122. The communication to the audio information defining centered audio content may cause the individual user devices to present individual dialogue audio content and/or centered sound effects in sync with the presentation of visual content and/or other effects audio content. An individual user device may be configured to selectively present an individual dialogue audio content. An individual user device may be configured to selectively present an individual dialogue audio content based on one or more of a preferred language, prefer rating, and/or other features. By way of non-limiting illustration, dialogue component 112 may be configured to effectuate communication of audio information defining the first centered audio content, synchronization information, and/or other information to a first user device associated with the first user to cause the first user device to present the first centered audio content in sync with the presentation of visual content and/or other effects audio content. By way of non-limiting illustration, dialogue component 112 may be configured to effectuate communication of audio information defining second centered audio content, synchronization information, and/or other information to a second user device associated with the second user to cause the second user device to present the second centered audio content in sync with the presentation of visual content and/or other effects audio content.

In some implementations, effectuating communication of audio information defining the individual centered audio content to individual user devices may comprise streaming one or more of the audio information defining individual centered audio content, the synchronization information, and/or other information to the individual user devices. Streaming may comprise continuously and incrementally communicating information.

In some implementations, effectuating communication of audio information defining individual centered audio content to individual user devices may include effectuating communication of audio information defining a set of centered audio content to the individual user devices. The individual user devices may be configured to selectively present an individual centered audio content based on one or more of an individual language and/or an individual rating associated with the individual centered audio content.

In some implementations, selectively presenting an individual centered audio content from a set of centered audio content may be based on individual user devices being tuned to certain frequencies of radio communication. By way of non-limiting illustration, audio information defining individual centered audio content and individual user devices may be associated with individual frequencies of radio communication. Effectuating communication of audio information defining individual centered audio content to the individual user devices may include wirelessly communicating individual centered audio content tuned to the associated ones of the individual frequencies. Accordingly, individual user devices may only receive or "pick up" the audio information defining centered audio content in the individual frequencies they may be tuned to. In some implementations, the individual user devices may be labeled and/or sorted based on the tuning and/or corresponding language and/or rating of the dialogue audio content which it is able to play back.

In some implementations, selectively presenting an individual centered audio content from a set of centered audio content may be based on user input into individual user devices. In some implementations, individual user devices may obtain the audio information defining a set of centered audio content of different languages and/or different ratings. The individual user devices may include one or more switches configured to select between audio information defining individual ones of the centered audio content so that only one dialogue audio content may be reproduced by the individual user devices for user consumption. A switch may include a physical switch and/or a virtual switch (e.g., presented on a graphical user interface).

In some implementations, dialogue component 112 may be configured to effectuate presentation of a user interface on the individual user devices. In some implementations, effectuating presentation of a user interface on the individual user devices may include communicating information necessary for the individual user devices to compile the user interface and/or access information from server(s) 102. The user interface may be configured to obtain user entry and/or selection of one or more of an individual language, an individual rating, and/or other input. In some implementations, responsive to the user entry and/or selection of the individual language and/or rating, the individual user devices may be configured to selectively present the individual dialogue audio content in the individual language and/or rating corresponding to the user entry and/or selection. In some implementations, the dialogue component 112 may communicate audio information defining dialogue audio content to individual user devices by streaming and/or other techniques. In some implementations, individual user devices may download audio information and/or other information.

The detection component 114 may be configured to detect presence of one or more user devices within one or more environments utilizing system 100. The detection component 114 may be configured to obtain output signals conveying detection information and/or other information. The output signals may be obtained from individual user devices. In some implementations, an environment may include one or more readers. The one or more readers may be configured to obtain information from individual user devices via one or more wireless communication components of the individual user devices. By way of non-limiting illustration, an environment may include one or more RFID readers configured to communicate with RFID chips of the individual user devices. The detection information may facilitate detection of individual user devices near and/or within an environment. By way of non-limiting illustration, detection component 114 may be configured to detect presence of one or more of the first user device, the second user device, and/or other user devices.

The detection component 114 may be configured to identify individual users of the individual user devices. In some implementations, the identities of the individual users may be included in the detection information and/or may be requested from the individual user devices. Users may provide input into individual user devices to provide permissions to obtain identities of the individual users. By way of non-limiting illustration, the detection component 114 may be configured to identify one or more of the first user of the first user device, the second user of the second user device, and/or other users.

The detection component 114 may be configured to obtain user profiles of the individual users. The user profiles may be obtained from profile information stored by electronic storage 118 and/or other storage location. In some implementations, individual user devices may store profile information for the individual users of the individual user devices.

The dialogue component 112 may be configured to select audio information defining individual audio content to communicate to the individual user devices associated with the individual users based on user profiles of the users. By way of non-limiting illustration, responsive to the first user profile indicating the language preference of the first language (and/or rating preference of a first rating), dialogue component 112 may be configured to select audio information defining first centered audio content to be communicated to the first user device. By way of non-limiting illustration, responsive to the second user profile indicating the language preference of the second language, dialogue component 112 may be configured to select the audio information defining the second centered audio content to be communicated to the second user device.

Figure 3:
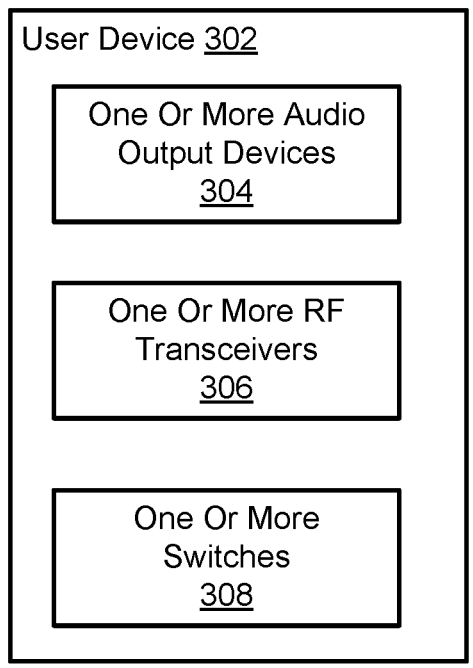
FIG. 3 illustrates an implementation of a user device.

FIG. 3 illustrates an implementation of a user device 302. The user device 302 may include one or more of one or more audio output devices 304, one or more radiofrequency (RF) transceivers 306, one or more switches 308, and/or other components. The user device 302 may comprise a stationary device or a mobile device. By way of non-limiting illustration, a stationary device may include components mounted within a seat. By way of non-limiting illustration, a mobile device may include headphones. The one or more audio output devices 304 may be configured to present audio content. By way of non-limiting illustration, an individual audio output device may include one or more of a speaker, a bone conduction element, and/or other devices. The one or more radio-frequency transceivers 306 may be configured to facilitate wireless communication with one or more servers (not shown in FIG. 3). Individual centered audio content may be associated with individual frequencies of radio communication. In some implementations, a set of centered audio content may be communicated indiscriminately. User device 302 may be configured to selectively tune, via one or more switches 308, to an individual frequency to playback centered audio content of a given language and/or rating.

Figure 4:
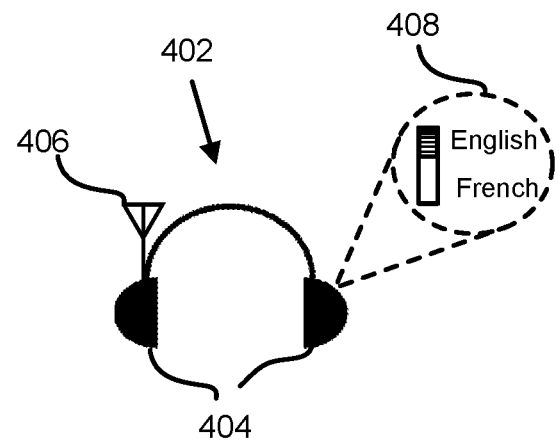
FIG. 4 illustrates an implementation of a user device.

FIG. 4 illustrates an implementation of a user device 402. The user device 402 may include one or more of one or more audio output devices 404, one or more radio-frequency transceivers 406, one or more switches 408, and/or other components. The user device 402 may comprise a mobile device, such as over-the-ear headphones. The one or more audio output devices 404 may be configured to present audio content. By way of non-limiting illustration, an individual audio output device may include one or more of a speaker, a bone conduction element, and/or other devices. The one or more radio-frequency transceivers 406 may be configured to facilitate wireless communication with one or more servers (not shown in FIG. 3). User device 402 may be configured to selectively tune, via one or more switches 408, to an individual frequency to playback centered audio content of a given language and/or rating.

Figure 5:
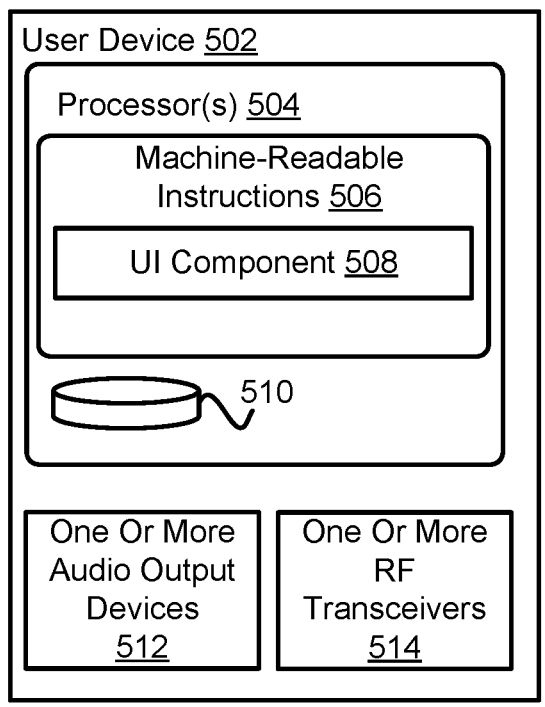
FIG. 5 illustrates an implementation of a user device.

FIG. 5 illustrates an implementation of a user device 502. The user device 502 may include one or more of one or more physical processors 504, non-transitory electronic storage 510, one or more audio output devices 512, one or more RF transceivers 514, and/or other components. The one or more audio output devices 512 may be configured to present audio content. By way of non-limiting illustration, an individual audio output device may include one or more of a speaker, a bone conduction element, and/or other devices. In some implementations, one or more audio output devices 510 may be removably connectable to user interface 502 via a port and/or other connector (wired and/or wireless). The one or more radio-frequency transceivers 514 may be configured to facilitate wireless communication with one or more servers (not shown in FIG. 5). The one or more radio-frequency transceivers 514 may be configured to facilitate detection of the user device 502.

The non-transitory electronic storage 510 may be configured to store information utilized by user device 502. The non-transitory electronic storage 510 may be configured to store media information for individual multimedia presentations, profile information, and/or other information. Profile information may include one or more user profiles. An individual user profile may indicate a language preference and/or rating preference for an individual user associated with the individual user profile.

The one or more physical processors 504 may be configured by machine-readable instructions 506. Executing machine-readable instructions 506 may cause one or more physical processors 504 to facilitate selective dialogue presentation. The machine-readable instructions 506 may include one or more computer program components. The one or more computer program components may include a user interface component 508 and/or other components.

The user interface component 508 may be configured to effectuate presentation of a user interface on user device 502. The user interface may be configured to obtain user entry and/or selection of an individual language and/or rating. Responsive to the user entry and/or selection of the individual language and/or rating, user device 502 may be configured to selectively present the individual centered audio content in the individual language and/or rating corresponding to the user entry and/or selection. In some implementations, selectively presenting the individual centered audio content may be based on receiving information defining the individual centered audio content streamed from a server (not shown in FIG. 5). In some implementations, selectively presenting the individual centered audio content may be based on obtaining information defining the individual centered audio content from electronic storage 510.

Figure 6:
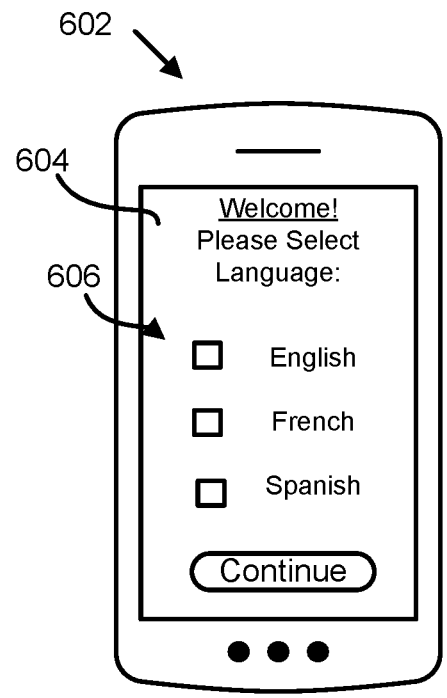
FIG. 6 illustrates an implementation of a user device.

FIG. 6 illustrates an implementation of a user device 602. The user device 602 may comprise a mobile device, such as a mobile computing platform. The user device 602 may present a user interface 604 configured to obtain user entry and/or selection of an individual language and/or rating. The user interface 604 may include one or more user interface elements configured to facilitate user interaction with the user interface 604. By way of non-limiting illustration, user interface elements may include one or more of text input fields, drop down menus, check boxes, display windows, virtual buttons, and/or other elements configured to facilitate user interaction. For example, a set of check boxes 606 may be configured to obtain user entry and/or selection of an individual language corresponding to an individual checkbox. Responsive to the user entry and/or selection of the individual language and/or rating, user device 602 may be configured to selectively present individual centered audio content in the individual language and/or rating corresponding to the user entry and/or selection. In some implementations, selectively presenting the individual centered audio content may be based on receiving information defining the individual centered audio content streamed from a server (not shown in FIG. 5). In some implementations, selectively presenting the individual centered audio content may be based on obtaining information defining the individual centered audio content stored locally on user device 602.

Figure 7:
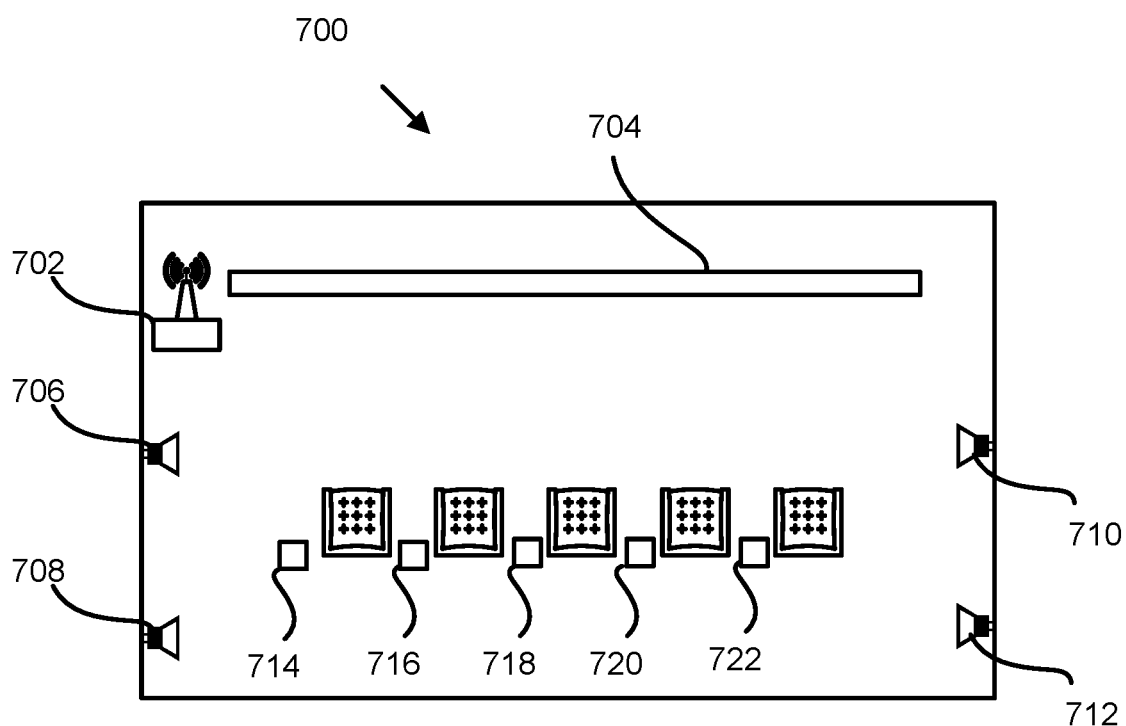
FIG. 7 illustrates an exemplary environment utilizing a system configured to facilitate selective dialogue presentation.

FIG. 7 illustrates an exemplary environment 700 utilizing a system configured to facilitate selective dialogue presentation, in accordance with one or more implementations. The environment 700 may include, for example, a movie theater. The system 700 may include one or more of one or more servers 702, a display device 704, a set of audio presentation devices (706, 708, 710, and 712), a set of user devices (714, 716, 718, 720, and 722), and/or other components. The one or more servers 702 may include one or more of one or more physical processors, non-transitory electronic storage, and/or other components. The non-transitory electronic storage may be configured to store information utilized by one or more servers 702, the set of user devices, the display device 704, the set of audio presentation devices, and/or other components.

Returning to FIG. 1, server(s) 102, one or more user devices 122, one or more display devices 126, one or more audio presentation devices 127, external resource(s) 124, and/or other components may be operatively linked via one or more electronic communication links. For example, such electronic communication links may be established, at least in part, via one or more networks 120. One or more networks 120 may include the Internet, Bluetooth, and/or other networks. It will be appreciated that this is not intended to be limiting and that the scope of this disclosure includes implementations in which components of system 100 may be operatively linked via some other communication media.

External resource(s) 124 may include sources of information, hosts, and/or providers of information outside of system 100, external entities participating with system 100, and/or other resources. In some implementations, some or all of the functionality attributed herein to external resource(s) 124 may be provided by resources included in system 100.

Server(s) 102 may include communication lines or ports to enable the exchange of information with a network and/or computing platform(s) 122. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 118 may include electronic storage media that electronically stores information. The electronic storage media of electronic storage 118 may include one or both of system storage that is provided integrally (i.e., substantially non-removable) with server(s) 102 and/or removable storage that is removably connectable to server(s) 102 via, for example, a port or a drive. A port may include a USB port, a firewire port, and/or other port. A drive may include a disk drive and/or other drive. Electronic storage 118 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 118 may include one or more virtual storage resources (e.g., cloud storage, a virtual private network, and/or other virtual storage resources). Electronic storage 118 may store software algorithms, information determined by processor(s) 104, information received from computing platform(s) 122, and/or other information that enables system 100 to function as described herein.

Processor(s) 104 may be configured to provide information-processing capabilities in server(s) 102. As such, processor(s) 104 may include one or more of a digital processor, an analog processor, a digital circuit designed to process information, an analog circuit designed to process information, a state machine, and/or other mechanisms for electronically processing information. Although processor(s) 104 is shown in FIG. 1 as a single entity, this is for illustrative purposes only. In some implementations, processor(s) 104 may include one or more processing units. These processing units may be physically located within the same device, or processor(s) 104 may represent processing functionality of a plurality of devices operating in coordination. The processor(s) 104 may be configured to execute components 108, 110, 112, and/or 114. Processor(s) 104 may be configured to execute components 108, 110, 112, and/or 114 by software; hardware; firmware; some combination of software, hardware, and/or firmware; and/or other mechanisms for configuring processing capabilities on processor(s) 104.

It should be appreciated that although components 108, 110, 112, and/or 114 are illustrated in FIG. 1 as being co-located within a single processing unit, in implementations in which processor(s) 104 includes multiple processing units, one or more of components 108, 110, 112, and/or 114 may be located remotely from the other components. While computer program components are described herein as being implemented via processor(s) 104 through machine readable instructions 106, this is merely for ease of reference and is not meant to be limiting. In some implementations, one or more functions of computer program components described herein may be implemented via hardware (e.g., dedicated chip, field-programmable gate array). One or more functions of computer program components described herein may be one or more of software-implemented, hardware-implemented, and/or software and hardware-implemented. The description of the functionality provided by the different components 108, 110, 112, and/or 114 described above is for illustrative purposes and is not intended to be limiting, as any of components 108, 110, 112, and/or 114 may provide more or less functionality than is described. For example, one or more of components 108, 110, 112, and/or 114 may be eliminated, and some or all of its functionality may be provided by other ones of components 108, 110, 112, 114, and/or other components. As another example, processor(s) 104 may be configured to execute one or more additional components that may perform some or all of the functionality attributed to one of components 108, 110, 112, and/or 114.

Figure 2:
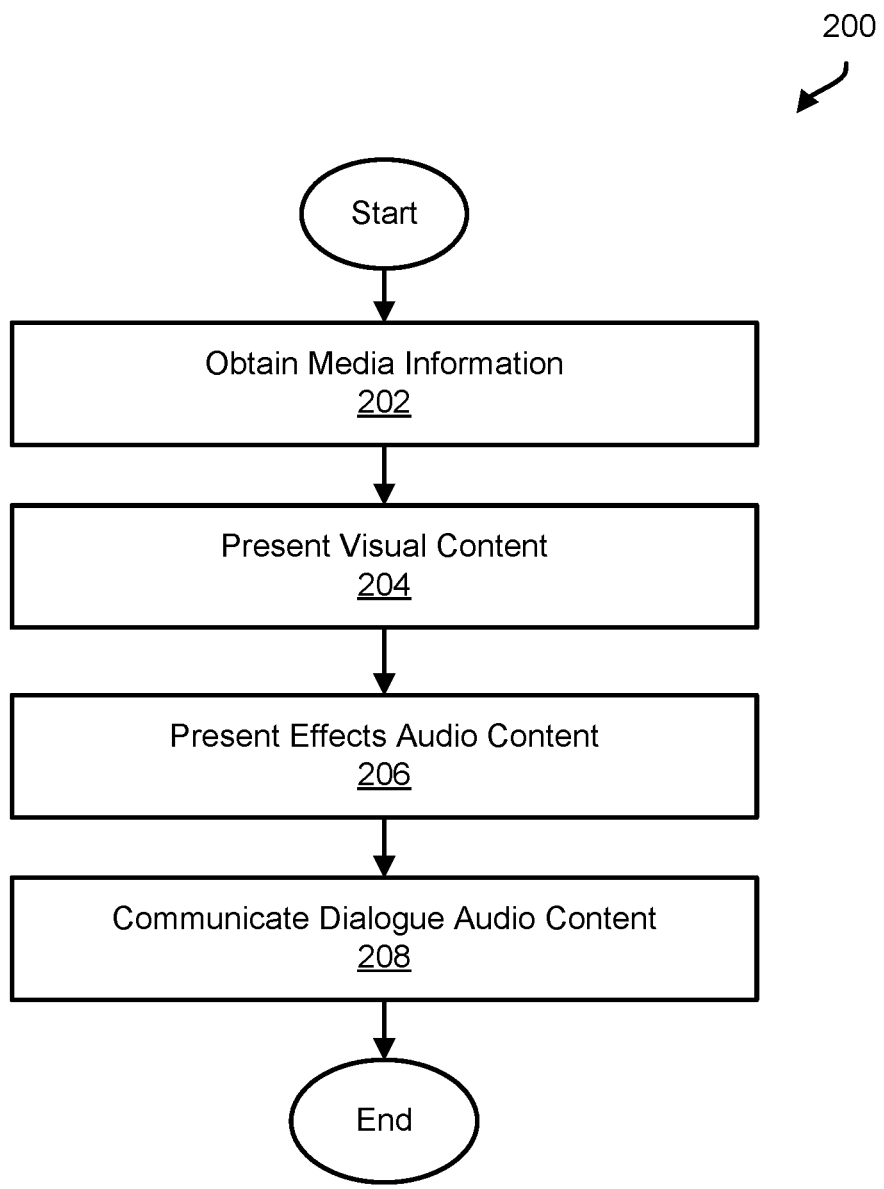
FIG. 2 illustrates a method to facilitate selective dialogue presentation, in accordance with one or more implementations.

FIG. 2 illustrates a method 200 to facilitate selective dialogue presentation. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in a system comprising one or more processing devices (e.g., a digital processor, an analog processor, a digital circuit designed to process information, an analog circuit designed to process information, a state machine, and/or other mechanisms for electronically processing information), storage media storing machine-readable instructions, one or more display devices, one or more user devices, one or more audio presentation devices, and/or other components. The one or more processing devices may include one or more devices executing some or all of the operations of method 200 in response to instructions stored electronically on electronic storage media. The one or more processing devices may include one or more devices configured through hardware, firmware, and/or software to be specifically designed for execution of one or more of the operations of method 200.

At an operation 202, media information for a multimedia presentation may be obtained. The media information may include one or more of visual information, audio information, and/or other information. The visual information may define visual content of the multimedia presentation. The visual content may be in the form of images, image sequences, lighting control sequences, and/or other content. The audio information may define one or more of effects audio content, a set of dialogue audio content, and/or other forms of audio content of the multimedia presentation. The effects audio content may include one or more of surround sound effects, centered sound effects, and/or other effects audio. The set of dialogue audio content may include separate and distinct dialogue audio content in different languages and/or different ratings. By way of non-limiting illustration, the set of dialogue audio content may include one or more of dialogue audio content in a first language, dialogue audio content in a second language, dialogue audio content of a first rating, dialogue audio content of a second rating, and/or other dialogue audio content. As used herein the term "centered audio content" may refer to one or both of individual dialogue audio content and/or centered sound effects of the effects audio content. In some implementations, operation 202 may be performed by one or more physical processors executing one or more components the same as or similar to one or more of visual component 108, effects component 110, and/or dialogue component 112 (shown in FIG. 1 and described herein).

At an operation 204, presentation may be effectuated of the visual content on a display device. In some implementations, operation 204 may be performed by one or more physical processors executing a component the same as or similar to visual component 108 (shown in FIG. 1 and described herein).

At an operation 206, presentation may be effectuated of the surround sound effects of the effects audio content by a set of audio presentation devices. The presentation of the effects audio content may be in sync with the presentation of the visual content. In some implementations, operation 206 may be performed by one or more physical processors executing a component the same as or similar to effects component 110 (shown in FIG. 1 and described herein).

At an operation 208, communication may be effectuated of individual centered audio content t to individual user devices included in a set of user devices associated with users. The communication to the individual user devices may cause the individual user devices to present the individual centered audio content in sync with the presentation of visual content and/or effects audio content. An individual user device may be configured to selectively present an individual centered audio content based on an individual language and/or rating. By way of non-limiting illustration, first centered audio content may be communicated to a first user device associated with a first user to cause the first user device to present the first centered audio content in sync with the presentation of visual content and/or effects audio content. By way of non-limiting illustration, second centered audio content may be communicated to a second user device associated with a second user to cause the second user device to present the second centered audio content in sync with the presentation of visual content and/or effects audio content. In some implementations, operation 208 may be performed by one or more physical processors executing a component the same as or similar to dialogue component 112 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to facilitate selective dialogue presentation, the system comprising:

non-transitory electronic storage storing media information for a multimedia presentation, the media information including visual information and audio information, the visual information defining visual content of the multimedia presentation, the audio information defining effects audio content and a set of centered audio content of the multimedia presentation, the effects audio content including surround sound effects, the set of centered audio content including separate and distinct centered audio content, such that the set of centered audio content includes first centered audio content and second centered audio content; and one or more physical processors configured by machine-readable instructions to:

effectuate presentation of the visual content on a display device;

effectuate presentation the effects audio content by a set of audio presentation devices, the presentation of the effects audio content being in sync with the presentation of the visual content; and effectuate communication of the audio information defining individual centered audio content to individual user devices included in a set of user devices associated with users to cause the individual user devices to present the individual centered audio content in sync with the presentation of the visual content and the effects audio content, such that the audio information defining the first centered audio content is communicated to a first user device associated with a first user to cause the first user device to present the first centered audio content in sync with the presentation of the visual content and the effects audio content, and the audio information defining the second centered audio content is communicated to a second user device associated with a second user to cause the second user device to present the second centered audio content in sync with the presentation of the visual content and the effects audio content.

2. The system of claim 1, wherein effectuating communication of the audio information defining the individual centered audio content to the individual user devices includes effectuating communication of the audio information defining the set of centered audio content to the individual user devices, wherein the individual user devices are configured to selectively present the individual centered audio content from the set of centered audio content.

3. The system of claim 2, wherein the individual centered audio content includes individual dialogue audio content and centered effects audio, wherein the individual dialogue audio content in the individual centered audio content includes dialogue of a given language and/or rating.

4. The system of claim 3, wherein the one or more physical processors are further configured by the machine-readable instructions to:

effectuate presentation of a user interface on the individual user devices, the user interface being configured to obtain user entry and/or selection of an individual language and/or individual rating; and responsive to the user entry and/or selection of the individual language and/or individual rating, selectively present the individual centered audio content corresponding to the user entry and/or selection of the individual language and/or individual rating.

5. The system of claim 2, wherein the audio information defining the individual centered audio content is associated with individual frequencies of radio communication, and wherein effectuating communication of the audio information defining the individual centered audio content to the individual user devices includes wirelessly communicating the audio information defining the individual centered audio content in associated ones of the individual frequencies of radio communication.

6. The system of claim 1, wherein the one or more physical processors are further configured by the machine-readable instructions to:
   detect presence of the individual user devices and identify individual users of the individual user devices, including detecting presence of the first user device and identifying the first user, and detecting presence of the second user device and identifying the second user;
   obtain user profiles for the individual users, individual user profiles indicating language and/or rating preference for the individual users, including obtaining a first user profile for the first user and a second user profile for the second user; and
   select the audio information defining the individual centered audio content to communicate to the individual user devices associated with the individual users based on the user profiles of the users, such that responsive to the first user profile indicating a first language and/or first rating preference, select the audio information defining the first centered audio content to be communicated to the first user device, and responsive to the second user profile indicating a second language and/or second rating preference, select the audio information defining the second centered audio content to be communicated to the second user device.

7. The system of claim 1, wherein the individual user devices are mobile.

8. The system of claim 1, wherein effectuating communication of the audio information defining the individual centered audio content to the individual user devices comprises streaming the audio information defining the individual centered audio content to the individual user devices.

9. The system of claim 1, wherein effectuating communication of the audio information defining the individual centered audio content to the individual user devices is via wireless communication.

10. The system of claim 1, wherein the non-transitory electronic storage further stores synchronization information, the synchronization information facilitating synchronized playback of two or more of the visual content, the effects audio content, or the individual centered audio content.

11. A method to facilitate selective dialogue presentation, the method comprising:
    storing media information for a multimedia presentation, the media information including visual information and audio information, the visual information defining visual content of the multimedia presentation, the audio information defining effects audio content and a set of centered audio content of the multimedia presentation, the effects audio content including surround sound effects, the set of centered audio content including separate and distinct centered audio content, such that the set of centered audio content includes first centered audio content and second centered audio content;
    effectuating presentation of the visual content on a display device;
    effectuating presentation the effects audio content by a set of audio presentation devices, the presentation of the effects audio content being in sync with the presentation of the visual content; and
    effectuating communication of the audio information defining individual centered audio content to individual user devices included in a set of user devices associated with users to cause the individual user devices to present the individual centered audio content in sync with the presentation of the visual content and the effects audio content, including communicating the audio information defining the first centered audio content to a first user device associated with a first user to cause the first user device to present the first centered audio content in sync with the presentation of the visual content and the effects audio content, and the audio information defining the second centered audio content to a second user device associated with a second user to cause the second user device to present the second centered audio content in sync with the presentation of the visual content and the effects audio content.

12. The method of claim 11, wherein effectuating communication of the audio information defining the individual centered audio content to the individual user devices includes effectuating communication of the audio information defining the set of centered audio content to the individual user devices, wherein the individual user devices are configured to selectively present the individual centered audio content from the set of centered audio content.

13. The method of claim 12, wherein the individual centered audio content includes individual dialogue audio content and centered effects audio, wherein the individual dialogue audio content in the individual centered audio content includes dialogue of a given language and/or rating.

14. The method of claim 13, further comprising:
    effectuating presentation of a user interface on the individual user devices, the user interface being configured to obtain user entry and/or selection of an individual language and/or individual rating; and
    responsive to the user entry and/or selection of the individual language and/or individual rating, selectively presenting the individual centered audio content corresponding to the user entry and/or selection of the individual language and/or individual rating.

15. The method of claim 12, wherein the audio information defining the individual centered audio content is associated with individual frequencies of radio communication, and wherein effectuating communication of the audio information defining the individual centered audio content to the individual user devices includes wirelessly communicating the audio information defining the individual centered audio content in associated ones of the individual frequencies of radio communication.

16. The method of claim 11, further comprising:
    detecting presence of the individual user devices and identifying individual users of the individual user devices, including detecting presence of the first user device and identifying the first user, and detecting presence of the second user device and identifying the second user;
    obtaining user profiles for the individual users, individual user profiles indicating language and/or rating preference for the individual users, including obtaining a first user profile for the first user and a second user profile for the second user; and
    selecting the audio information defining the individual centered audio content to communicate to the individual user devices associated with the individual users based on the user profiles of the users, including responsive to the first user profile indicating a first language and/or first rating preference, selecting the audio information defining the first centered audio content to be communicated to the first user device, and responsive to the second user profile indicating a second language and/or second rating preference, selecting the audio information defining the second centered audio content to be communicated to the second user device.

17. The method of claim 11, wherein the individual user devices are mobile.

18. The method of claim 11, wherein effectuating communication of the audio information defining the individual centered audio content to the individual user devices comprises streaming the audio information defining the individual centered audio content to the individual user devices.

19. The method of claim 11, wherein effectuating communication of the audio information defining the individual centered audio content to the individual user devices is via wireless communication.

20. The method of claim 11, further comprising storing synchronization information, the synchronization information facilitating synchronized playback of two or more of the visual content, the effects audio content, or the individual centered audio content.

* * * * *